(12) United States Patent
Gow et al.

(10) Patent No.: US 6,601,527 B2
(45) Date of Patent: Aug. 5, 2003

(54) METHOD OF CULTIVATING PIPER METHYSTICUM PLANTS

(75) Inventors: Robert Gow, Naples, FL (US); John A. Pierce, Moreno Valley, CA (US); William Julian, Pahoa, HI (US)

(73) Assignee: HerbalScience, LLC, Naples, FL (US)

(*) Notice: Subject to any disclaimer, the term of this patent is extended or adjusted under 35 U.S.C. 154(b) by 0 days.

(21) Appl. No.: 10/087,246

(22) Filed: Mar. 1, 2002

(65) Prior Publication Data

US 2003/0000437 A1 Jan. 2, 2003

Related U.S. Application Data (60) Provisional application No. 60/278,873, filed on Mar. 26, 2001.

(51) Int. Cl.[7] .............................. A01C 1/00; A01G 1/00
(52) U.S. Cl. ..................... 111/100; 111/200; 111/900; 111/906; 47/7; 47/58.1; 47/DIG. 3
(58) Field of Search ............................. 111/200, 900, 111/906, 919, 100; 47/7, 1.01 R, 58.1, DIG. 3

(56) References Cited

U.S. PATENT DOCUMENTS

| | | | |
|---|---|---|---|
| 4,518,280 A | 5/1985 | Fletcher | ............... 405/17 |
| 6,293,045 B1 | 9/2001 | Morgan | ............... 47/9 |

OTHER PUBLICATIONS

Int'l Search Report dated Sep. 11, 2002 for PCT/US02/08797.

Primary Examiner—Christopher J. Novosad
(74) Attorney, Agent, or Firm—Mitchell S. Feller; Clifford Chance US LLP (57) ABSTRACT

An improved method of cultivating kava plants is disclosed in which a growth medium is formed form a mound formed over a leveled bed of porous rocks, such as volcanic cinders. The bed material is substantially free of organic matter. The mound material is comprised of gravel smaller than the bed material, such as volcanic gravel, and includes organic matter. The kava plants are grown in the mound material. The plants can be harvested by lifting the plant from the mound using a modified forklift assembly. Relatively high mounded rows of other material can alternatively be used. An improved method of producing kava seedlings is also disclosed in which the apical tips of kava plant stems are cut. After buds develop along the stems, the stems are harvested, sectioned, and used to generate a large number of seedlings. Harvesting of remaining rootstock from the parent plant is delayed after harvesting of the stems to promote an increase in kavalactone concentration.

50 Claims, 9 Drawing Sheets

3 Foot Spacing

| Descriptor | Row 1 | r 2 | R 3 | r 4 | r 5 | r 6 | Total/ave |
|---|---|---|---|---|---|---|---|
| Row Length | 86 | 108 | 159 | 184 | 196 | 196 | 929.00 |
| Plant Count | 26 | 31 | 48 | 58 | 62 | 62 | 287.00 |
| Actual Spacing: | 3.31 | 3.48 | 3.31 | 3.17 | 3.16 | 3.16 | 3.24 |
| Plants Per Acre Eq. | | | | | | | 2223.34 |
| Acres Per Block: | | | | | | | 0.13 |
| Yield Per Block: | | | | | | | 4822.00 |
| Yield Per Acre: | | | | | | | 37427.16 |
| % Laterals | | | | | | | 0.55 |
| Lbs./ Plant | | | | | | | 16.83 |
| Actual Hrs. Per Pound | | | | | | | 0.01078 |
| Non Experiment Hrs/lb average | | | | | | | 0.01109 |
| % Change | | | | | | | 2.76% |

FIG. 6A

2 Foot Spacing

| Descriptor | Row 1 | r2 | R3 | r4 | r5 | r6 | Total/ave |
|---|---|---|---|---|---|---|---|
| Row Length | 199 | 198 | 196 | 195 | 193 | 191 | 1172.00 |
| Plant Count | 98 | 94 | 90 | 87 | 85 | 80 | 534.00 |
| Actual Spacing: | 2.03 | 2.11 | 2.18 | 2.24 | 2.27 | 2.39 | 2.19 |
| Plants Per Acre Eq. | | | | | | | 3279.09 |
| Acres Per Block: | | | | | | | 0.16 |
| Yield Per Block: | | | | | | | 7162.50 |
| Yield Per Acre: | | | | | | | 44066.89 |
| % Laterals | | | | | | | 0.50 |
| Lbs./Plant | | | | | | | 13.44 |
| Actual Hrs. Per Pound | | | | | | | 0.00921 |
| Non Experiment Hrs/lb Average | | | | | | | 0.01109 |
| % Change | | | | | | | 16.91% |

FIG. 6B

1 Foot Spacing

| Descriptor | Row 1 | r 2 | R 3 | r 4 | r 5 | Total/Ave |
|---|---|---|---|---|---|---|
| Row Length | 108 | 80 | 80 | 70 | 61 | 399.00 |
| Plant Count | 82 | 51 | 50 | 48 | 39 | 270.00 |
| Actual Spacing: | 1.32 | 1.57 | 1.60 | 1.46 | 1.56 | 1.48 |
| Plants Per Acre Eq. | | | | | | 4870.02 |
| Acres Per Block: | | | | | | 0.06 |
| Yield Per Block: | | | | | | 2216.50 |
| Yield Per Acre: | | | | | | 40056.25 |
| % Laterals | | | | | | 0.49 |
| Lbs./ Plant | | | | | | 8.23 |
| Actual Hrs. Per Pound | | | | | | 0.014437 |
| Non Experiment Hrs/lb Average | | | | | | 0.01109 |
| % Change | | | | | | -30.18% |

FIG. 6C

Comparison of Growth Results

| Descriptor | Control | R1 | R2 | R3 |
|---|---|---|---|---|
| Spacing | 6'x4' | 6'x3.24' | 6'x2.19' | 6'x1.48' |
| Average Age | 24.1 | 25 | 25 | 25 |
| Yield Per Acre (lbs): | 36548.60 | 37427 | 44066 | 40056 |
| Yield Per Plant (lbs): | 20.30 | 16.83 | 13.44 | 8.23 |
| Plants Per Acre | 1800 | 2223 | 3279 | 4870 |
| Man Hours Per Hundredweight | 1.11 | 1.08 | 0.92 | 1.44 |
| %Labor Savings Vs. Control | -- | 2.8% | 17.0% | -30.2% |

FIG. 6D

METHOD OF CULTIVATING PIPER METHYSTICUM PLANTS

CROSS-REFERENCE TO RELATED APPLICATIONS:

This application claims priority under 35 U.S.C. §119 to U.S. Provisional Patent Application Ser. No. 60/278,873 entitled "Improved Method Of Cultivating Piper Methysticum Plants," filed on Mar. 26, 2001, the entire contents of which is hereby expressly incorporated by reference.

FIELD OF THE INVENTION

This invention is related to a method of cultivating kava plants, and in particular, to a cultivation method that results in rootstock and lateral roots of improved size while also simplifying planting and harvesting. The invention is also related to improved methods of generating seedlings which can be used to cultivate kava plants.

BACKGROUND

Kava plants, a type of pepper plant also known as Piper methysticum, are generally found in Polynesia, Melanesia, and Micronesia. The kava plant contains high concentrations of kavalactones, including kavain, methysticin, and yangonin, and has been used as an herbal medicine. The prized part of the kava plant is the root system because it contains the highest concentrations of the active ingredients, the kavalactones. The concentrations of the individual kavalactones can vary depending on the particular kava cultivar. General information about kava plants can be found in Vincent Lebot, et al., *"Kava The Pacific Elixir, The Definitive Guide to its Ethnobotany. History, and Chemistry"*, Inner Traditions Intl. Ltd. (March 1997).

The root system of the kava plant consists of two major parts: (1) the rootstock or stump or corm, and (2) the lateral roots. The above-ground stems grow upward from the rootstock, and the below-ground lateral roots grow out radially from the rootstock. On average, the concentrations of the kavalactones in the lateral roots are two to three times higher than in the rootstock. Thus, the lateral roots are more commercially valuable by weight then the rootstock.

After a kava plant is harvested, the root is typically dried and then ground to a powder. The powder can be packaged into capsules or other forms and can be mixed with water to form a beverage. The effects of ingesting kava root extract will vary from person to person, and also on the manner in which the kava is ingested, such as via capsules, tea, etc. Common effects include a state of relaxation and a reduction in muscle tenseness. Kava root has been used to help sufferers of insomnia. It can also produce a mild state of euphoria.

Kava plants grow best in deep, friable, well-drained soils that are rich in organic matter. The plant is very nutrient demanding and the highest yields are generally obtained in silica-clay soils having a pH of 5.5 to 6.5. Historically, several specialized techniques have been developed by kava growers to improve the yield or appearance of the root system. In one technique, a stem cutting is placed into a hollow tree trunk and the kava is allowed to grow inside of the trunk. Although this technique can produce high quality rootstock and lateral roots, it suffers from low yields. The harvest, post-harvest, and replanting cycle time for this technique is also lengthy. In an alternative technique, used in the islands of the Pacific where there are relatively young volcanic lava flows which have not yet weathered into deep soils, such as Samoa, kava is grown in pits which are filled with organic matter. This technique also suffers from a long harvest, post-harvest, and replanting cycle time.

Conventional commercial cultivation of kava typically involves digging a series of holes in clay soil into which kava seedlings are planted. Although appearing simple, in practice this is generally a time-consuming and expensive process. The planted seedlings must mature for one and one-half years or more in order for there to be a sufficient concentration and proportion of kavalactones in the roots to provide roots which are commercially valuable enough to harvest. During this growth period, the plants are exposed to nematodes and insects and infestations are common. Pesticides and herbicides are therefore often used to reduce damage caused by these pests.

After the kava plants have matured, they are harvested for their roots. Conventional harvesting is done by hand using a flat bladed digging fork pushed around and under the rootstcok and roots. Modern techniques use mechanized equipment, such as a backhoe, to dig the rootstock and lateral roots out of the ground. Full excavation is a drawn-out process and can often take an hour or more per-plant because the lateral roots can penetrate two to three meters into the ground. Mechanical excavation can also damage the roots, particularly the smaller and more valuable lateral roots. The time required to excavate a plant can be reduced at the expense of reducing the amount of the root system, and the amount of lateral roots in particular, which is excavated for harvest. However, such a solution also reduces the value of the harvested plant because the loss is concentrated in the kavalactone rich lateral roots. Processing time is further increased because the clay soil can be relatively difficult to remove from the roots unless careful cleaning techniques are used.

Accordingly, it would be advantageous to provide an improved method of cultivating kava plants as an agricultural root crop which provides for a high rate of growth to minimize growth cycle time while also producing high concentrations of kavalactones.

It would be a further advantage if such a method would permit easy excavation and cleaning to minimize harvest cycle time and post-harvest processing time and further enable rapid planting of young kava plants after excavation of the mature kava plants to minimize the replanting cycle time.

It would be yet a further advantage if such a method resulted in reduced damage to the plants from pests and fungus, and therefore permitted commercially suitable crops to be grown with reduced and preferably no use of pesticides and herbicides.

Kava plants do not produce fruit or seeds and are propagated via cuttings from a mother plant. Thus, in order to farm kava plants in quantity, cuttings of the kava stalks need to be transplanted. Conventional techniques for generating kava seedlings are based on directly transplanting the cuttings and the typical success rate is less than 50%. Accordingly, it would be advantageous to provide an improved technique of generating kava plant seedlings. It would be a further advantage if such a method stimulated production of lateral root mass and increased kavalactone concentration in the mother plant.

SUMMARY OF THE INVENTION

These and other advantages are achieved through the use of a new method for kava growth which utilizes a growth medium for the rootstock and lateral roots that permits easy and fast planting and harvesting. According to one aspect of the invention, a growth medium is formed in which kava plants are grown in mounds or mounded rows which are between about 12 inches and 40 inches in height, and preferably, between 18–30 inches. By providing such unconventionally high mounds or mounded rows, a robust and extensive root growth is promoted. Several different compositions for the growth medium can be used depending on the environment in which the kava is to be grown.

A kava seedling is planted in each mound or several seedlings are planted in a spaced-apart arrangement in the mounded rows. When a plant has matured, it is preferably harvested by using a forklift with a suitable fork or other appropriate equipment to uproot the plant and lift it out of the mound. The plant is shaken to remove the loose soil and the roots are cleaned by immersion in tanks of water and preferably with high pressure jets of water. The entire plant can then be placed in a refrigerated container and transported for subsequent processing.

Use of the present methods provide a significant increase in total size of the harvested root structure, and particularly a significant increase in the amount of lateral roots relative to rootstock which is harvested. A concurrent increase in net concentration of kavalactones as a percentage of harvested root bio-mass is also achieved. As a result, commercially superior roots can be obtained in a growth period which is four to six months shorter than the conventional growth period.

Advantageously, through use of this method, harvesting and replanting are also simplified and the harvest cycle time is greatly accelerated. Unlike conventional techniques where the kava plant must be carefully and laboriously dug from the ground by hand or with the aid of a backhoe to harvest the roots, the raised mounds or mounded rows allow easy access to the root structure using a hydraulic lifting fork which can be inserted into the mound at or near ground level and then lifted to excavate the plant. Further, the mounds or mounded rows can easily be reformed after harvesting to allow subsequent planting of another kava seeding.

According to a further aspect of the invention, an improved technique for producing seedlings from a kava plant is disclosed in which the apical tip of a kava plant stem is cut. This generates subsequent growth of buds in the uncut stem which can be later harvested to provide a large number of seedlings for subsequent planting. Advantageously, the initial cut and subsequent new-growth harvest also stimulates, at least to some extent, the production of lateral root mass and an increase in kavalactone concentrations in the root of the mother plant a period of time after the stem is harvested for seedlings. As a result, the generation and harvesting of seedlings does not reduce the commercial value of the root mass in the mother plant and can, in some circumstances, even enhance it.

BRIEF DESCRIPTION OF THE FIGURES

The foregoing and other features of the present invention will be more readily apparent from the following detailed description and drawings of illustrative embodiments of the invention in which.

DETAILED DESCRIPTION OF THE PREFERRED EMBODIMENTS:

The present method is directed to the cultivation of the *Piper Methysticum* Forst. f plant, which is a member of the pepper family, Piperaceae. Indigenous names for the *Piper Methysticum* Forst f plant include 'awa in the Hawaiian Islands, ava in Western and American Samoa, sakau in Micronesia, and kava in Vanuatu. As used herein, the term "kava" will be used when referring to *Piper Methysticum* Forst. f. Various cultivars of kava are characterized by the concentrations of the six major kavalactones in the lateral roots of the plant. The present method is suitable for use in all cultivars and chemotypes of kava, including the cultivation of the Hawaiian cultivars Hiwa, Puna Green, Nene, Hanakapiai, Oahu 236, Oahu 241, Mahakea, Papa EleEle, Mapulehu, and Honokanaiki, and other cultivars of the kava plant that are grown in the islands of the Pacific and elsewhere. The present method can also be used for the cultivation of other non-kava root crops as will be recognized by those of skill in the art.

According to one aspect of the invention, a growth medium for kava is provided which is comprised of mounds or mounded rows which, unlike conventional rows which are generally low to the ground, are relatively high such that at least a substantial portion of the kava root mass grows within the mound and does not extend substantially into the earth below.

Figure 1:
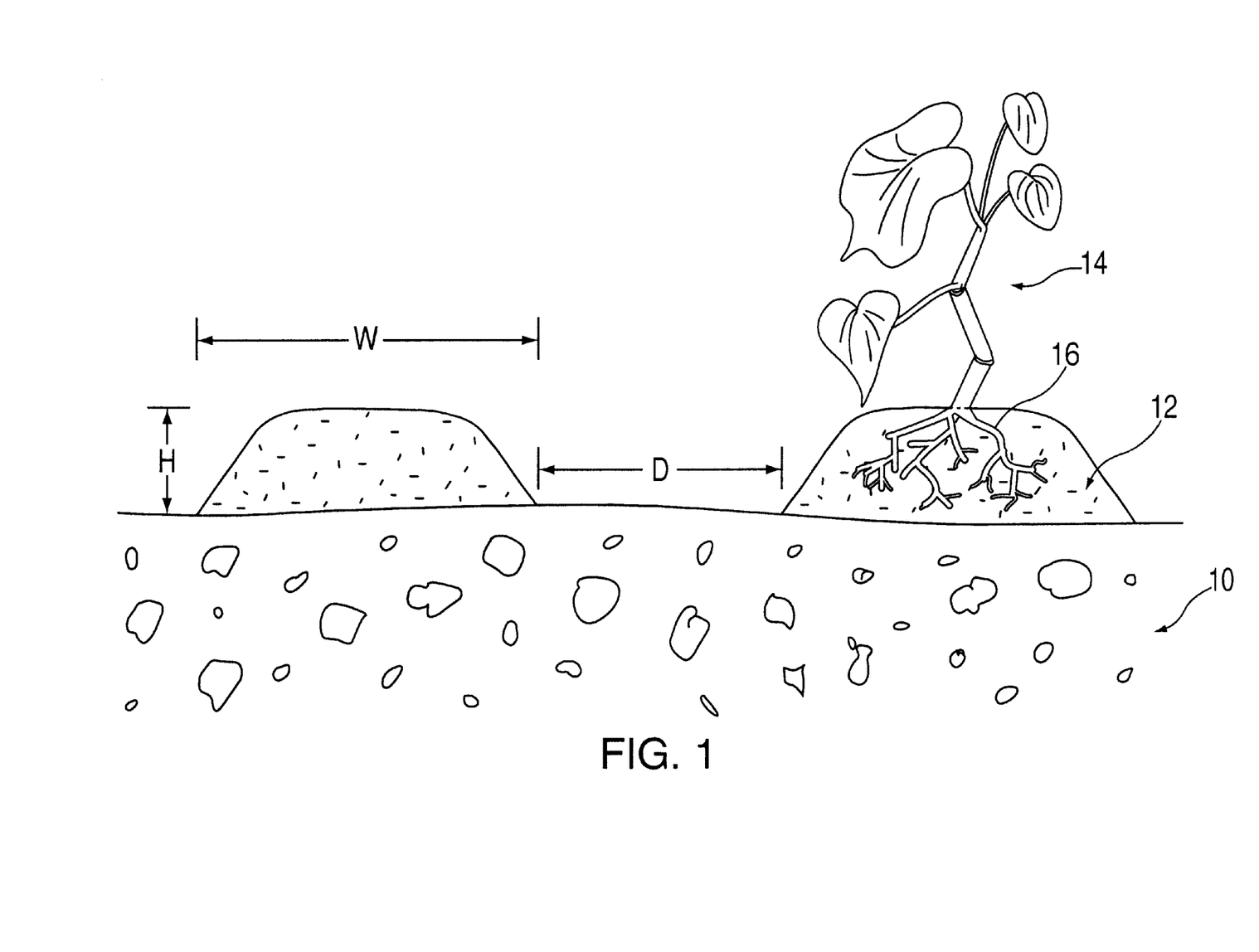
FIG. 1 is a cross-sectional diagram illustrating a first embodiment of growth medium for kava plants in accordance with the present invention.

Turning to FIG. 1, there is shown a cross-sectional diagram illustrating the growth medium for kava plants in accordance with one embodiment of the present method. The growth medium comprises is a mound 12 which is built-up on a generally leveled bed. This embodiment is preferable for use in environments where the ground is not a true soil, but instead is generally comprised of lava rock with some growth in it. Such an environment can be found in the Puna region South-South-East of Hilo, Hawaii.

The bed is substantially free of organic matter and is comprised of a generally porous material, such as rocks or other objects, which are sized and packed to produce a generally porous composition of sufficient depth to provide good drainage. The "rocks" comprising bed 12 preferably range in size from about 3 to about 46 cm in average diameter and the bed is preferably hard enough to support mechanized equipment. A preferred bed material is volcanic cinder from lava flows. However, alternative materials can also be used, including broken up asphalt, cement, rock, concrete, or the like. Comparably sized wood chips may also be used.

The mound 12 is comprised of a mixture of a particulate filler which is at least somewhat porous combined with an organic soil amendment which can range from approximately 5% to approximately 80% of the total mound by mass. More preferably, the mixture is approximately 50% organic matter by mass. The particle sizes of the particulate filler are substantially smaller than those in the bed 10 and preferably range in average diameter from about 10 microns to about 2 cm. The filler acts to prevent clumping of the organic matter while retaining sufficient moisture to promote growth without soaking. A preferred type of filler is volcanic rock or gravel. Alternative fillers include sand, vermiculite, and perlite. Comparably sized wood chips may also be used. Advantageously, the porous nature of the filler, particularly the volcanic gravel filler, reduces the likelihood of nematode infestation and fungus growth, and thereby reduces the costs associated with pest control and poor quality harvests. Moreover, the volcanic gravel is generally a better insulator than alternatives and thus better prevents undue moisture loss.

A mound can be characterized by its height and the maximum width at the base. Preferably, each mound 12 is formed into a generally conical shape with a flattened top. The height and width of the mound 12 can vary widely and should be selected with consideration of the overall size of the kava root mass at the end of its growth cycle at the anticipated time of harvest. It has been found that mound heights of between about 12 to 40 inches and most preferably between 18 and 30 inches and mound widths at the base a width between about 2 to 6.5 feet provide acceptable results. For mound heights approaching 40 inches, the width can be extended to about 8 feet to ensure that the sides of the mound are not too steep for it to retain its structural integrity.

Once the mound has been formed, a kava seedling 14 can be planted in the mound using conventional techniques. Preferably, only one seeding is cultivated in each mound. However, multiple seedlings can be initially planted in a mound to ensure that at least one will propagate successfully and, after successful growth has been established, the plants in the mound culled as required to leave a single plant and root 16. The mounds are preferably placed in rows which are spaced sufficiently far apart from each other to provide easy access to each plant by mechanized excavation/harvesting equipment. The spacing between the rows is therefore dependent on the size of the equipment. Spacings between mounds in the range of from about 3 to 8 feet are typical.

In an alternative growth embodiment, suitable for use in regions where the soil is predominantly clay and is low in organic content, such as soil comprised of decomposed lava rock that occurs in the Hamakua area West of Hilo, Hawaii, mounded rows are formed having a height of between about 18 and 40 inches and are preferably spaced between about 5 to 6 feet apart. Kava seedlings are planted in the mounded row between 12 to 18 inches apart. According to one aspect of this embodiment of the invention, gravel or cinder material can be incorporated into the clay soil to provide structural integrity to the mound. Preferably, beginning at the base of the mound and proceeding upwards, the percentage of cinder material is reduced from a ratio of cinder material to clay at the base of between about 80% to 100% cinder with respect to volume to a ratio of between about 5% to 15% at the top of the mound. The cinder material preferably has characteristics similar to that used in the area of Puna where Kava plants are grown upon a bed of porous lava rock, typically from 0.1 cm to 2.0 cm in diameter.

In a further alternative embodiment, suitable for growing kava in a softer powdery clay type soil which need not contain cinder material, the soil is prepared, e.g., by deep-ploughing and rotor tilling, and then formed into mounded rows between about 24 to 36 inches in height. The kava plants are placed between about 15 to 30 inches apart in a row. Ground cover can also be placed over the mounds to reduce washing away of the soil by heavy rains.

Preferably, kava is grown according to the mound or mounded row embodiments discussed above in-ground. Alternatively, at least the bed 10 can be formed in a suitable container, such as a large pot, over which the mound is formed. This embodiment may be more suitable for small-scale kava cultivation, in environments where the preferred bed material is not naturally present, where the weather is such that greenhouse cultivation is preferred, or for various other reasons.

The conventional practice in commercial cultivation of kava is to plant the kava in widely separated rows and space the plants in each row as much as 6 to 8 feet apart. This practice arises from the belief that very wide spacing between kava plants is required to allow the individual kava plants to grow without interference from neighboring plants, thereby maximizing the root mass of each plant and, as a result, the quantity of root harvested per acre. According to a specific aspect of the invention, kava is planted at substantially reduced spacing of between 1 and 3 feet, and preferably 2 feet. It has been unexpectedly discovered that growing kava plants at this reduced spacing, while resulting in plants with individually smaller root mass, provides a marked increase in the net root yield per acre as well as significantly lower labor cost.

Figure 2:
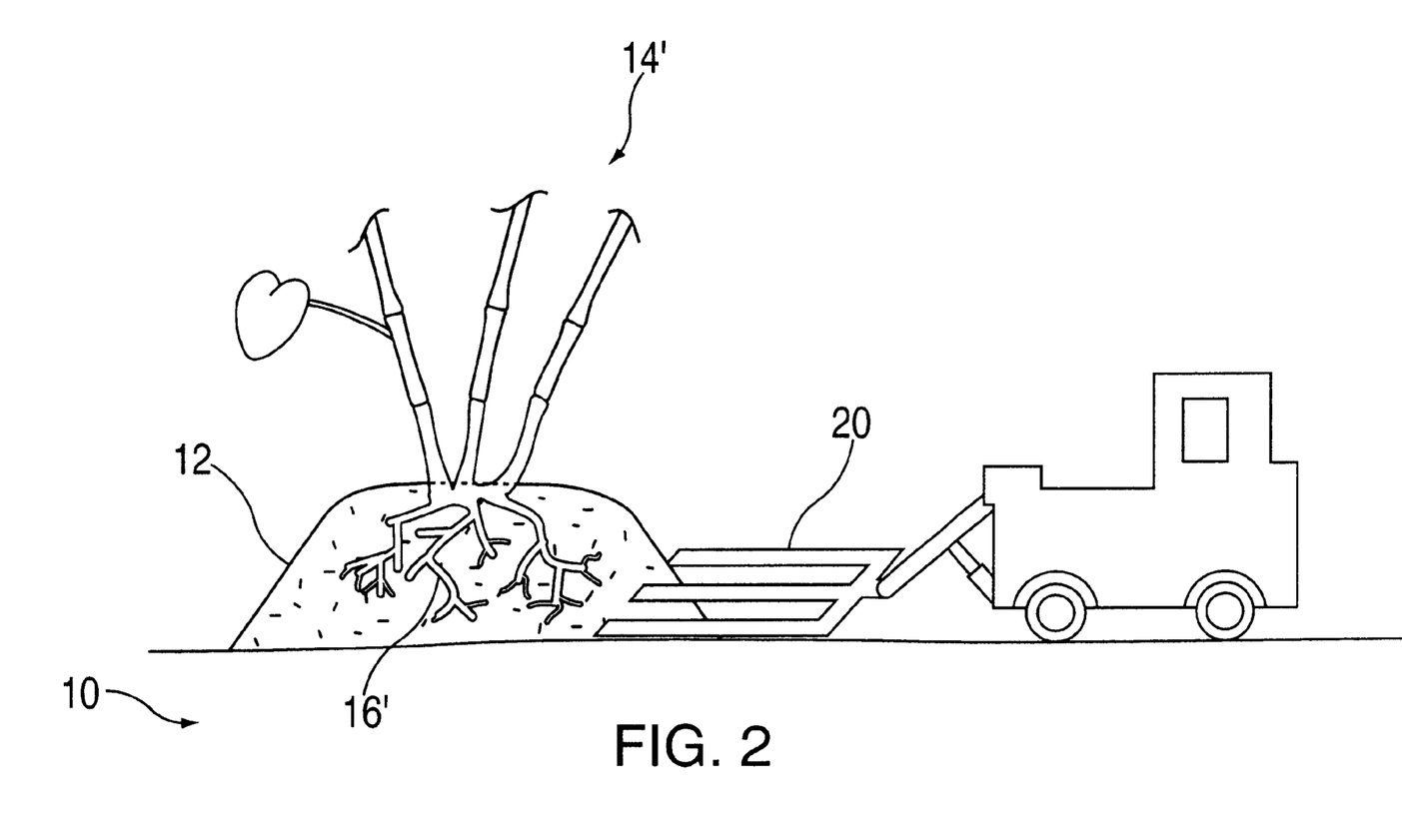
FIG. 2 is an illustration of a mature kava plant in the medium of FIG. 1 further showing a preferred tool for the excavation of the rootstock and lateral roots of kava grown according to the present invention.

Turning to FIG. 2, there is shown an illustration of a mature kava plant 14' and rootstock 16' in the medium of FIG. 1 further showing a preferred tool for the excavation of the rootstock and lateral roots of kava grown according to the present invention. During a suitable growth period, the root structure 16 of the kava plant 14 spreads throughout the mound 12 and only minimally into the bed 10. To harvest the plant, it must be extracted from the mound and the solid debris removed from the root-ball structure.

A mechanized excavation tool is generally used to remove the kava plant 14. Advantageously, because the mounds 12 are raised above the bed 10, the root structure of the plant can be accessed from the side and digging is not required. The ease of removal also permits the entire plant to be excavated with substantially all of its roots intact. A preferred tool for use in this process is a metal fork 20 on a hydraulic forklift. Most preferably, the fork 20 has a least three generally parallel prongs with no central or forward cross-pieces, such as shown (not to scale) in FIG. 2. (A rear cross-piece may be present to attach the fork prongs to each other and/or to the lifting mechanism). This configuration permits the fork to simultaneously support the central rootstock and plant body as well as the more desired outlying lateral roots while also allowing it to be relatively easy to insert into the mound 12.

The fork 20 is inserted into the base of the mound such that the entire plant and mound is contained within the dimensions of the fork. The fork is then raised to uproot the kava plant. The plant is preferably lifted high enough so that the mass of rootstock and lateral roots are approximately one-half to one meter above the top of the mound. The extraction tool is manipulated to shake and/or rock the root mass in order to dislodge loose the soil trapped in the root mass. Because the mound material is loosely packed, particularly relative to dense clay soil in which kava is conventionally grown, the debris is more easily removed from the root mass then conventional clay soil. After the kava plant is extracted, the mound can be easily reformed for the subsequent planting of a new kava seedling.

A similar technique can be used to harvest kava grown in the alternative mounded row embodiments discussed above.

The concentration of kavalactones in the plant is believed to increase during the night and decrease during the day. Preferably, therefore, harvesting of kava plants commences shortly before sunrise. The excavation of the rootstock and lateral roots of kava grown according to the present invention can be done in a matter of minutes, about ten times more quickly then conventional excavation of below-ground kava plants using a backhoe or similar equipment. As a result, the harvest cycle time is substantially reduced and significantly more kava can be harvested during the critical pre-dawn period than is possible using conventional techniques and similar resources.

Once harvested, the roots of the plant can be immersed in tanks of purified water, potassium citrate, or other aqueous solutions which are suitable for cleaning and preserving organically-grown plants. One or more jets of high pressure water can also be used to clean the roots and release the fine particles of gravel from the root mass. Finally, the plant is placed into a refrigerated container at a temperature of approximately 7° C. for storage and transport to a processing facility. The entire process of excavating, cleaning, and storing a kava plant grown according to the present techniques can be performed in an average of 15 minutes, considerably more quickly then conventional techniques.

Moreover, while conventional growth and harvest techniques can damage the roots, making sale of fresh, unprocessed root material difficult, the present methods permit the roots to be quickly harvested and cleaned with little damage. As a result, the present techniques permit the harvesting of kava roots which are better suited for sale as fresh rootstock, as opposed to being dried and ground.

Relative to conventional kava harvesting techniques, harvesting of kava grown according to the present methods provides a root mass with a better distribution of total root material. In particular, more of the mass of the root is in the form of the lateral roots. Conventional kava root harvests typically yield a root mass comprising only about 20% to 30% by weight of the more desired lateral root with the remaining 70% to 80% being the stump or corm. It has been found that through the use of the present methods for growing and harvesting kava plants, the lateral roots comprise approximately 70% to 80% by weight of the total root harvest. Thus, in addition to significantly increasing the speed at which kava with roots of marketable size can be grown, a product with a significantly higher commercial value by weight is produced. This permits commercially competitive kava roots to be grown four to six months more quickly than the conventional growth period of one and one-half to two years or more, and advantageously, allows a greater number of kava plants to be grown and harvested over a given period of time.

Kava plants do not produce fruit nor seeds and are propagated via cuttings from a mother plant. According to a further aspect of the invention, a method of producing kava seedlings is presented. Advantageously, the present method produces both a large number of seedlings in an efficient manner and also can promote an increase in lateral root mass and kavalactone concentrations in the mother plant, thus increasing its commercial value.

Figure 3:
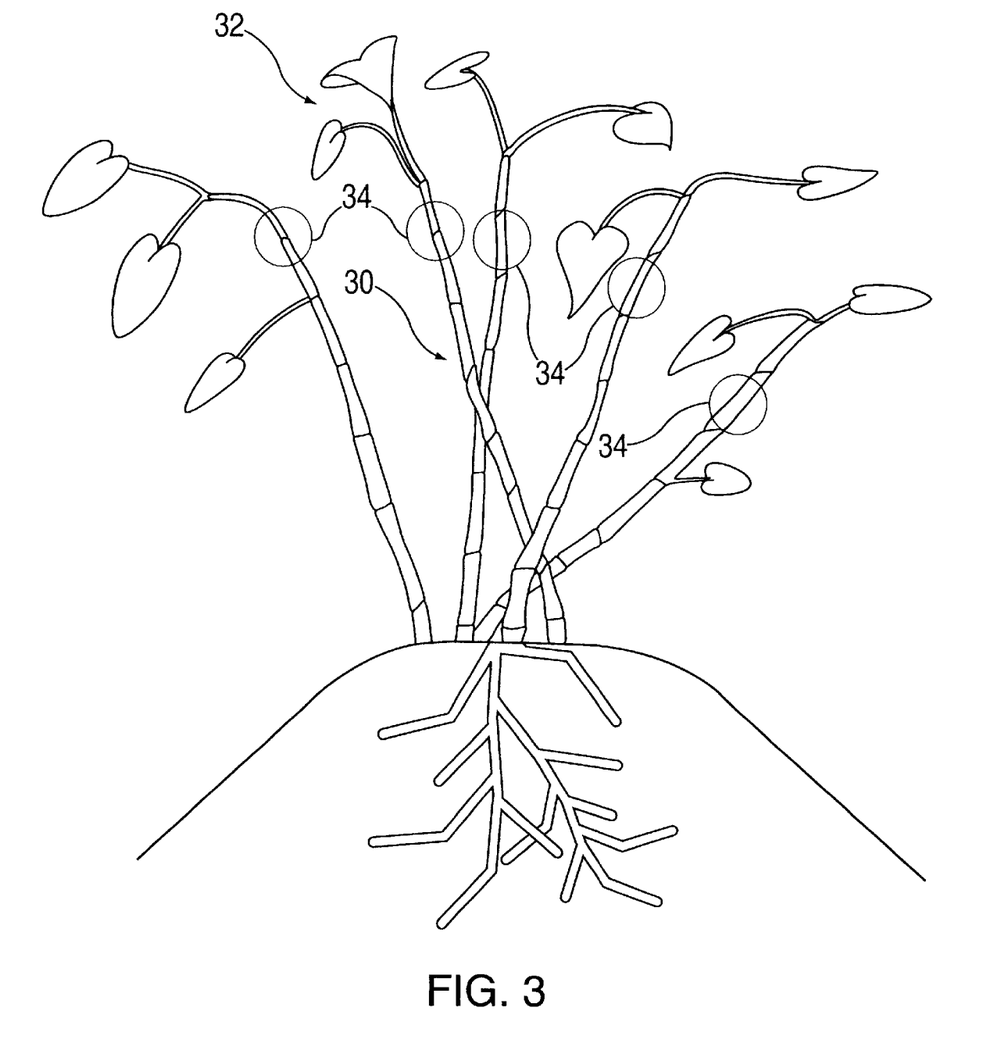
FIGS. 3–5 illustrate a preferred technique for generating kava seedlings.
Figure 4:
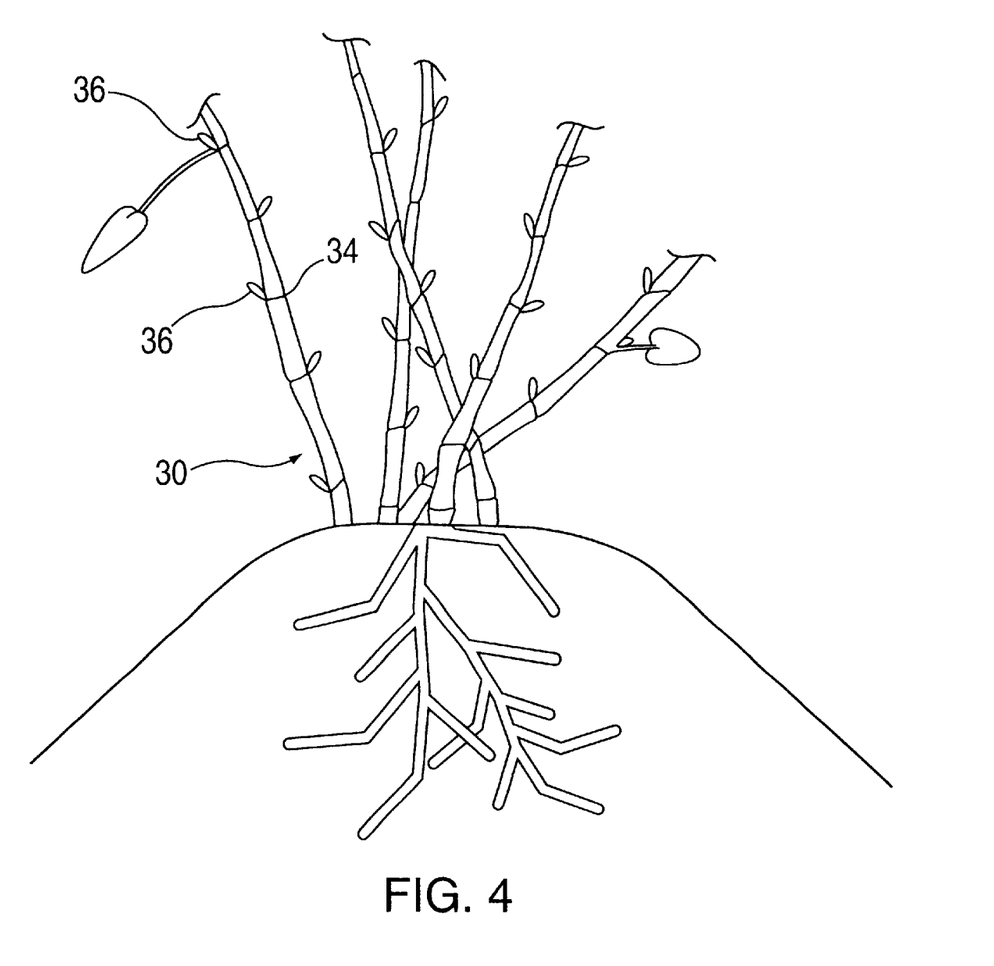

With reference to FIG. 3, the tip 32 of at least one stem or stalk 30 on the "parent" kava plant is cut off at a point 34 that is approximately two or three nodes or knuckles down from the top of the stem. This initial cutting of the kava plant stimulates desirable root production in the cut plant. In addition, as shown in FIG. 4, it stimulates the growth of new buds at the remaining portion of the stem 30. The buds 36 emanate in the region of the knuckles 34, and generally at points where the leaves join the stalk. Buds may also form on regions of the stem where leaves are often not present.

Unlike conventional techniques, where the initial apical cutting is transplanted in an effort to produce a seedling, the initial cutting is not used for seedling production. Instead, the first cutting can be discarded and the buds on the parent kava plant are allowed to grow for a period of time ranging from about 10 to 18 days after the cutting, and preferably about 14 days. After this time, new buds will have formed and will be visible on the stalk.

Figure 5:
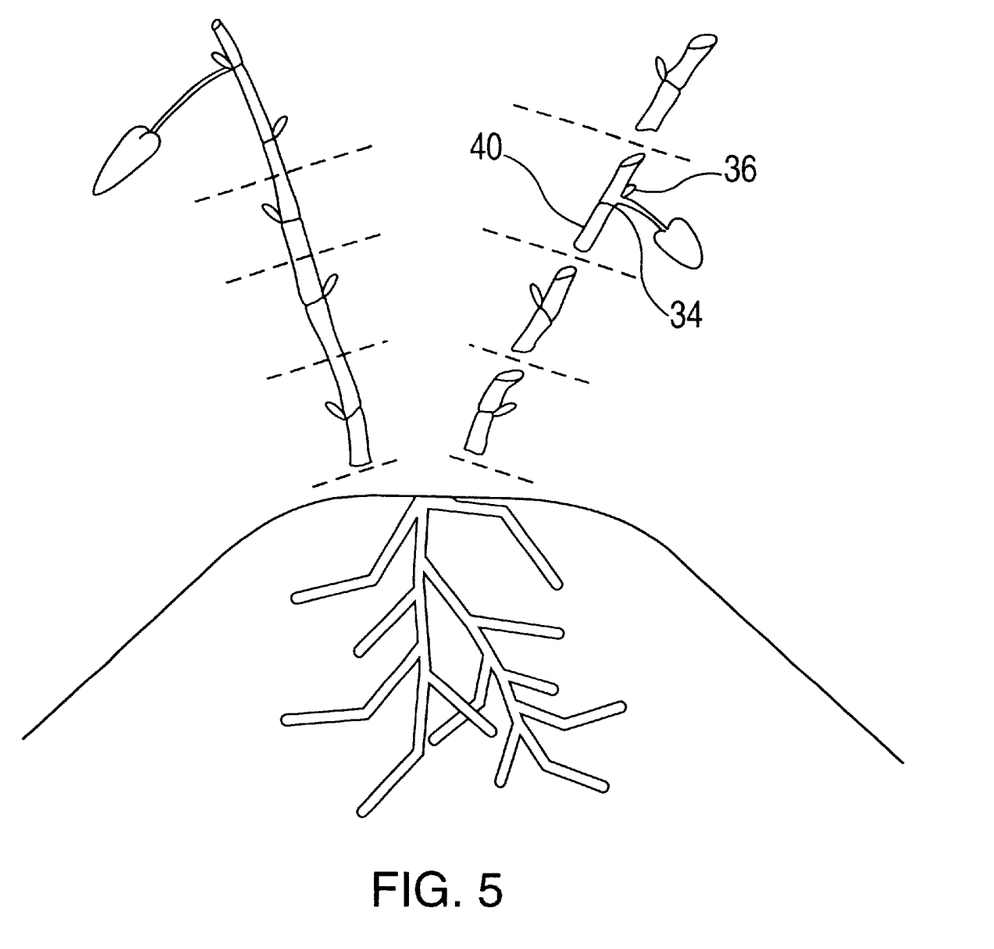
Figure 6A:
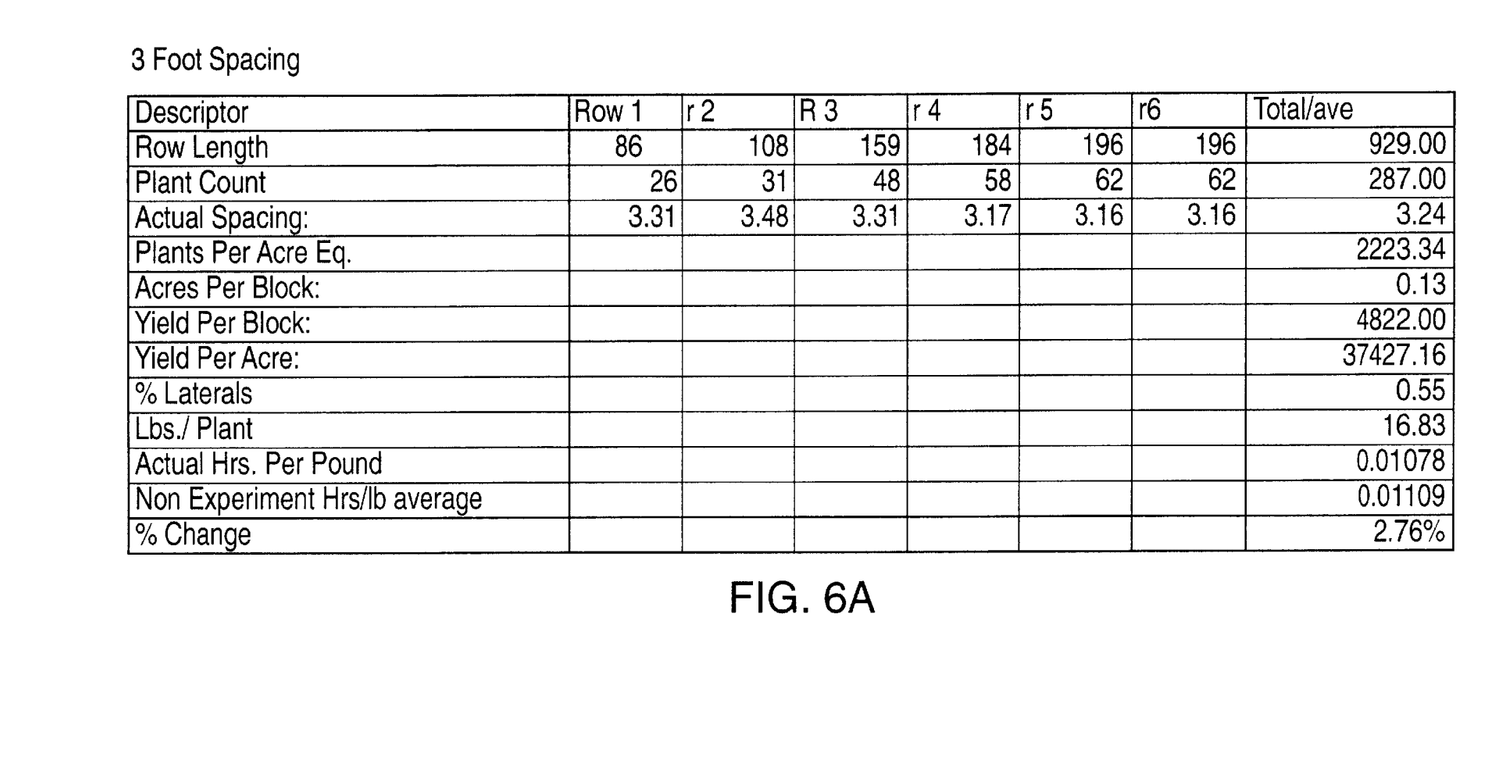
FIGS. 6A–D are tables showing the harvest results of growing kava seedings of spacings of three to one feet apart, respectively (FIGS. 6A–6C) and a comparison to a control with a spacing of four feet between seedlings (FIG. 6D).
Figure 6B:
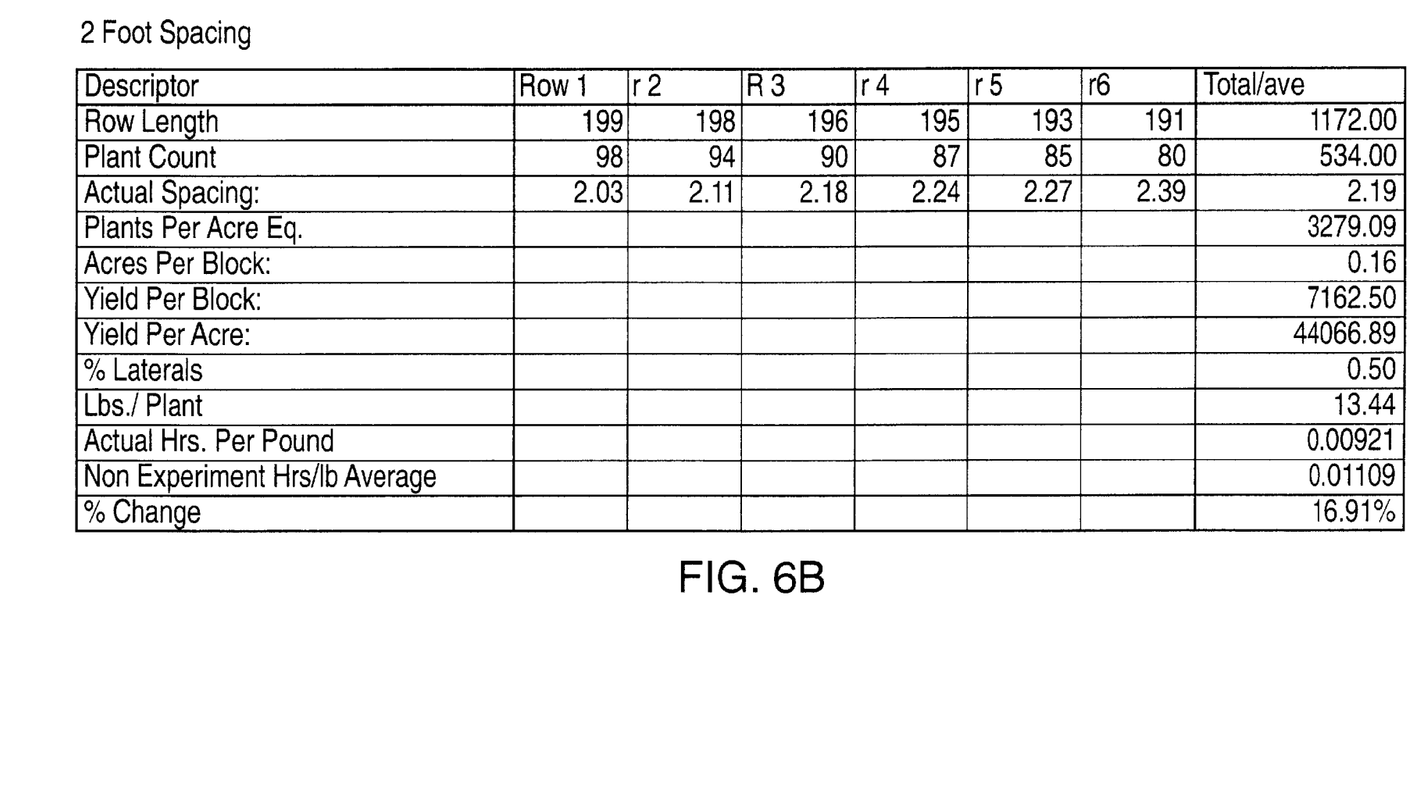
Figure 6C:
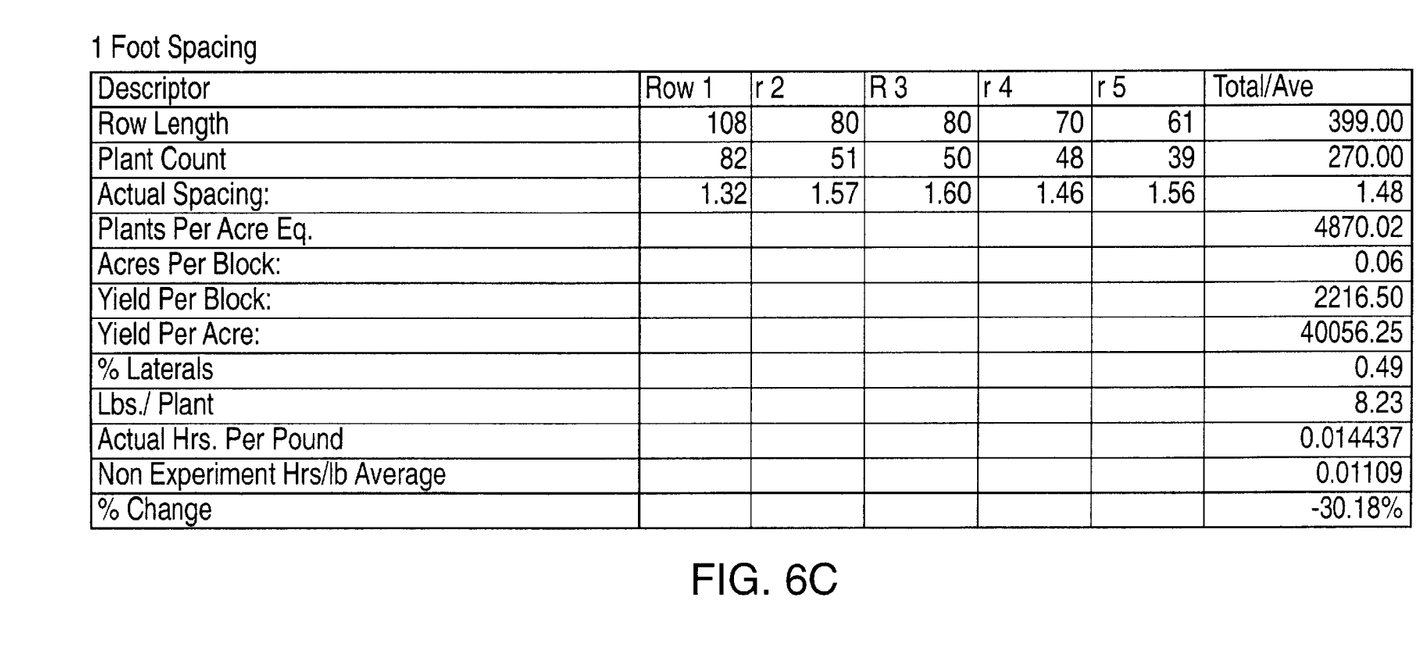
Figure 6D:
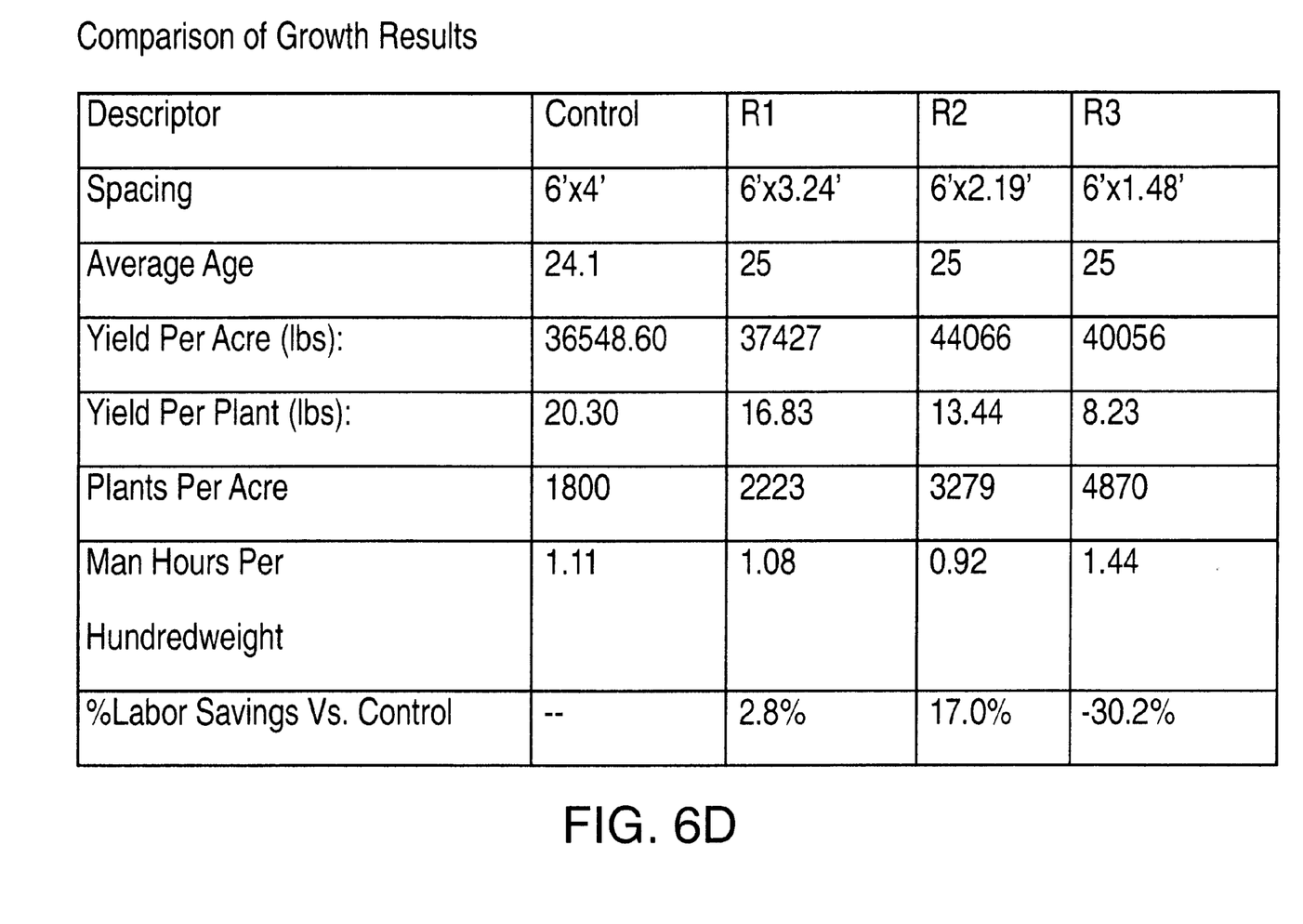

With reference to FIG. 5, the buds 36 are harvested by cutting sections 40 from the stalk 30 such that each cut section 40 contains a knuckle 34 with a bud 36. Preferably whole stalks with the formed buds are completely severed from the plant at ground level. The stem section cuts are preferably made diagonally across the stem. Preferably, each section 40 contains two nodes as well as the bud that had formed along with the existing leaf, if present. Leaves which are present on the sections 40 can be removed but this is not necessary and it is preferred that leaves which are present on sections 40 are retained. A conventional sealant can be applied to the cut ends of the section to prevent infestation and drying.

It has also been found that this second cutting of the stalk 30 may further encourage and promote the development of higher concentrations of kavalactones in the remaining root mass 42 of the parent plant over a period of time following the cutting of the seedling stalks. Thus, while the remaining root mass can be harvested after the cutting of the stalks, preferably, the parent root mass is left in the ground for a period of between about 7 to 14 days before harvesting.

The cut stalk sections 40, which are typically approximately 2 to 5 inches in length, are each placed into a pot of potting soil and positioned so that the end of the cut stalk which contains the bud is angled upright above ground and the other end of the cut stalk is contained below ground level. The cut stalks are then kept shaded and the soil moist for a second period of time in the range of 2 to 5 weeks, and preferably about one month. After this second period of time, a new leaf shoot will have grown that is about 8 to 15 inches above ground level, and the seedling is ready for transplantation into the field. The seedling can be planted in a variety of ways. Preferably, the seeding is transplanted into a growth medium mound configured as described above.

As will be appreciated, in conventional methodologies where the cut apical tips of the stems are used for seedling transplants, only a small number of seedlings could be harvested from a single plant, e.g., one per stem. In contrast, with the use of the present invention, 50 to 100 potential seedlings per plant can be generated. This allows a large population of kava seedlings to be quickly and easily grown.

EXAMPLE 1

In a controlled experiment to measure yield per acre as a function of the spacing between plants, kava seedlings were planted in adjacent fields. The soil condition in each field was deep soft powdery clay type soil with little or no cinder content and low organic content. Before planting each field, the soil was deep-ploughed and rotor tilled and formed into mounded rows six feet apart and 30" high. The spacings between plants in a row varied by field, ranging from 1 to 4 feet apart. The four-foot spaced field, being closest to the conventional 6 to 8 foot spacing was considered the control plot.

The seedlings were allowed to mature for two years and were then harvested using a combination of machine and hand labor wherein a root under-cut bar was pulled through a mounded row by a tractor and then the plants were shaken free of soil. The overall yield per acre of kava root along with the average cost to harvest (in average number of hours to harvest per pound of yield) was determined and compared. The results of the experiment for 1–3 foot spacing are summarized in the tables of FIG. 6A–6D For the control plot, 1,800 kava seedlings were planted in a field at a standard spacing of 6 feet between rows and 4 feet between planting. The plants were harvested after 24 months of growth, providing a yield of 20 lbs per plant and an average yield of 36,548 lbs per acre.

In an adjacent field, 3,279 kava seedlings were planted at a two foot spacing. While it would be expected that the average root harvest per plant would be about half that for plants spaced at four feet apart, plants harvested after 24 months had an average yield of 13.44 lbs per plant, yielding an equivalent 44,067 lbs per acre—a 26% increase in anticipated yield per acre over traditional 4 foot spacing. In addition to the greater yield, the lower weight of each kava plant at 2 foot spacing allowed for more rapid and easier harvesting, to the extent that a harvest time per pound was reduced from a normal time of 0.01109 hrs/lb (at 4 foot spacing) to 0.00921 hrs/lb, a time savings of nearly 17%.

The yield per acre was also greater than normal at 3 feet and 1 foot spacing. However, in practice, at these spacings, the reduction in plant weight was not sufficient to offset the increased time to harvest a greater number of plants. The cost between 3 and 4 foot spacings were comparable and was 30% greater at 1 foot. Accordingly, while plant spacing in the range of 1–3 feet provide an increase in overall yield per acre when compared to the conventional 4 foot spacings, a spacing of about 2 feet per plant is most preferred since this provides both a substantially increased yield while also reducing the overall time for harvest.

EXAMPLE 2

The following is a sample study of the relationship between preparing the aerial portion of the Kava plant for purposes of seedling propagation and the effect upon the kavalactone levels in the lateral roots of the plant. As shown below, by preparing the stalks of kava plants for purposes of generating seedlings, a positive effect can be achieved on the kavalactone content in the roots of the plant and, in the worst case, the seedling generation process, does not negatively effect the kavalactone concentrations in the plant roots.

This study, conducted in Hawaii, was performed over a period of 4 weeks during which time samples of lateral roots were obtained for kavalactone analysis. Because kavalactone concentrations can vary over the course of a day, all samples of lateral roots that were collected were taken in the early hours of the morning. It should be recognized that kavalactone concentrations also vary throughout the root system and so lateral root samples taken at the same time from the same plant can have somewhat differing concentrations. As a result, although individual data points are presented below, conclusions are drawn from average values from samples taken over the course of several days.

A total of five culitvars of Kava plants of Hawaiian origin were selected for the study, namely: Hiwa, Nene, Moi, Mahakea, and Puna Green. All of these were grown in the Puna district of Hawaii in the method of cultivation that employed the formation of mounds using cinder material as disclosed above. The plants used for the test were two years old.

On day zero, the stalks of the kava plants were cut one node below the apical tip of each of the stalks and a sample of the lateral roots was collected from the plant approximately 4 cm below the surface of the mound (as was done for each subsequent sampling). Over a period of two weeks, buds formed on the stalks at each node. On days, 3, 7, and 14, samples of lateral root were collected for analysis.

On day 14, after the lateral root sample was collected, the stalks which now had emerging buds at each of the nodes were all cut to ground level as if the stalks were to be used for preparation of seedlings. At this point in time, the kava plants did not have any aerial portion. Additional lateral root samples were collected on days 17, 21, 24, and 28.

In total there were 40 lateral root samples that were analyzed for their kavalactone content and moisture content. All kavalactone levels are reported on a dry weight basis. The kavalactone content of the lateral root samples was extracted using a Soxhlet apparatus with ethanol as the solvent over a period of 12 hours. The samples thus generated were analyzed for their kavalactone content as follows:

The kavalactones in a sample were analyzed on a Waters HPLC chromatographic system using Millenium Software, a 600E system controller, 717 autosampler, binary pump and Waters PDA flow cell spectrophotometer. Although the PDA detector collected data from 220 nm to 450 nm, for purposes of quantification a wavelength of 245 nm was used. The column used was a reversed-phase Prodigy $5\mu$ C-18 (4.6 mm×250 mm) HPLC column from Phenomenex with a guard column in place.

The HPLC system was operated with three solvents: (A) water with 0.1% acetic acid, (B) iso-propanol, and (C) acetonitrile. The amount injected varied from 3 to 20 microliters. The specific solvent mix, flow rate, and duration of flow for the HPLC analysis is as follows:

The initial flow was 1.25 ml per minute. From minutes 0 to 20, the solvent proportion was 65% A, 19% B, and 16% C using curve "1" on Waters solvent programming selection. From minutes 20 to 28, the proportion was 0% A, 0% B, and 100% C using curve "5" on the Waters solvent programming selection. Flow increased to 1.50 ml per minute. From minutes 28 to 33, the proportion was 65% A, 19% B, and 16% C using curve "3" on the Waters solvent programming selection. From minutes 33 to 38, the proportion was 65% A, 19% B, and 16% C using curve "2" on the Waters solvent programming selection. Flow changed to 1.25 ml per minute. From minutes 38 to 40, the proportion was 65% A, 19% B, and 16% C using curve "1" on the Waters solvent programming selection.

The order of elution was as follows: (a) methysticin at 12.1 minutes, (b) dihydromethysticin at 12.8 minutes, (c) dehydromethysticin at 13.8 minutes, (d) kavain at 16.1 minutes, (e) dihydrokavain at 17.8 minutes, (f) yangonin at 21.6 minutes, and (g) dehydrokavain at 23.6 minutes. There is no standard available for dehydromethysticin. The six standards (excluding dehydromethysticin) were obtained from Chromadex in Irvine, Calif.

The aggregate kavalactone concentrations for each of the samples and cultivars are summarized in the table below:

| Day | Hiwa | Nene | Moi | Mahakea | Puna Green |
|---|---|---|---|---|---|
| | | Apical Tip of Stalk Cut on Day 0 | | | |
| 0 | 15.3% | 17.8% | 11.3% | 12.1% | 13.1% |
| 3 | 11.2% | 13.9% | 8.0% | 11.9% | 13.5% |
| 7 | 14.5% | 11.3% | 14.3% | 12.9% | 11.2% |
| 14 | 16.0% | 14.7% | 12.7% | 15.4% | 18.6% |

-continued

| Day | Hiwa | Nene | Moi | Mahakea | Puna Green |
|---|---|---|---|---|---|
| All Above-Ground Stalks Cut to Ground Level on Day 14 | | | | | |
| 17 | 16.4% | 11.2% | 13.0% | 17.6% | 16.6% |
| 21 | 12.9% | 15.0% | 17.4% | 12.5% | 19.0% |
| 24 | 15.9% | 16.6% | 12.5% | 19.7% | 15.5% |
| 28 | 12.5% | 12.5% | 14.0% | 15.3% | 18.4% |

In order to account for variations in kavalactone percentages due to natural concentration variations in different portions of the root mass of a given plant, the concentrations for several days can be averaged. The average kavalactone percentage in the first three samplings (Day 0 through Day 7) was:

|  | Hiwa | Nene | Moi | Mahakea | Puna Green |
|---|---|---|---|---|---|
| Kavalactone | 13.7% | 14.3% | 11.2% | 12.3% | 12.6% |

From one to two weeks after cutting the stalks at ground level (e.g., days 21, 24, and 28) the average kavalactone percentage was:

|  | Hiwa | Nene | Moi | Mahakea | Puna Green |
|---|---|---|---|---|---|
| Kavalactone | 13.8% | 14.7% | 14.6% | 15.8% | 17.6% |

The percent increase between the average over days 0 through 7 and days 21 to 28 was:

|  | Hiwa | Nene | Moi | Mahakea | Puna Green |
|---|---|---|---|---|---|
| % INCREASE | <1% | 3% | 30% | 28% | 40% |

This study shows a linkage between preparing the kava plant for seedling propagation and a discernible increase in kavalactone levels within the lateral roots of the parent kava plant. This increase is slightly variable temporally (varying between 7 and 10 days after removal of the aerial portion), and also between cultivars, with the Mahakea and Puna Green cultivar being the most dramatic. Thus, delaying harvesting of the parent root mass a period of time after cutting of the stalks to harvest the buds for seedlings, preferably between 7 and 14 days, can provide a substantial net increase in the kavalactone percentage in the root mass of at least some cultivars while not negatively impacting the kavalactone concentrations in other cultivars.

While the present invention has been described herein in terms of its preferred embodiment, various changes in the details may be made without departing from the spirit and scope of the invention.

What is claimed is:

1. A method of cultivating kava plants comprising the steps of:
   (a) providing a generally leveled bed of porous material substantially free from organic matter;
   (b) forming at least one mound over the bed of a combination of filler material and organic matter, the organic matter comprising in the range of approximately 5% to 80% by mass of the combination;
   (c) planting a kava seedling in each mound.

2. The method of claim 1, wherein the bed of porous material comprises packed objects having an average diameter in the range of about 3 cm and 46 cm.

3. The method of claim 2, wherein the porous material comprises volcanic cinder.

4. The method of claim 1, wherein the filler has an average diameter in the range of about 10 microns to about 2 cm.

5. The method of claim 4, wherein the filler is volcanic gravel.

6. The method of claim 1, wherein the organic matter comprises approximately 50% by mass of the combination.

7. The method of claim 1, wherein each mound has a height in the range of between approximately 12 inches and 40 inches and a base width between approximately 2 and 8 feet.

8. The method of claim 7, wherein each mound has a height in the range of between approximately 18 and 30 inches and a base width between approximately 2 and 6.5 feet.

9. The method of claim 1, wherein a plurality of mounds are formed into rows spaced between approximately 1 to 3 meters apart.

10. The method of claim 1, further comprising the steps of harvesting the kava plant by:
    (d) lifting the kava plant out of the mound; and
    (e) shaking the plant to remove debris from rootstock and lateral roots of the kava plant.

11. The method of claim 10, wherein the kava plant is lifted at least approximately one-half meter above a top of the mound.

12. The method of claim 10, wherein the kava plant is lifted using a forklift having a fork with at least three substantially parallel prongs and lacking centrally or forwardly located cross-pieces.

13. A kava plant cultivated according to the method of claim 1.

14. A kava root harvested from the plant of claim 13.

15. A method of cultivating kava plants comprising the steps of:
    providing a mounded row having a height between about 12 and 40 inches and comprising predominantly (a) clay soil which is low in organic content and (b) cinder;
    the mounded row having a ratio of cinder material to clay with respect to volume of about 80% to 100% cinder at a base portion of the mounded row and a ratio of between about 5% to 15% at a top portion of the mounded row; and
    planting a plurality of kava seedling in the mounded row.

16. The method of claim 15, wherein the kava seedlings are planted in the mounded row between about 12 to 18 inches apart.

17. The method of claim 15, wherein the cinder comprises porous lava rock having an average diameter between about 0.1 cm and 2.0 cm.

18. The method of claim 15, further comprising the steps of harvesting the kava plants by:
    lifting each kava plant out of the mounded row; and
    shaking the plant to remove debris from rootstock and lateral roots of the kava plant.

19. The method of claim 18, wherein the kava plant is lifted using a forklift having a fork with at least three substantially parallel prongs and lacking centrally or forwardly located cross-pieces.

20. A kava plant cultivated according to the method of claim 15.

21. A kava root harvested from the plant of claim 20.

22. A method of cultivating kava plants comprising the steps of:
provided a mounded row having a height between about 24 and 36 inches and comprising predominantly soft powdery clay;
planting a plurality of kava seedling in the mounded row in spaced about 15 to 30 inches apart.

23. The method of claim 22, further comprising the steps of harvesting the kava plants by:
lifting each kava plant out of the mounded row; and
shaking the plant to remove debris from rootstock and lateral roots of the kava plant.

24. The method of claim 22, wherein the kava plant is lifted using a forklift having a fork with at least three substantially parallel prongs and lacking centrally or forwardly located cross-pieces.

25. A kava plant cultivated according to the method of claim 25.

26. A kava root harvested from the plant of claim 20.

27. A method of producing kava seedlings from a kava plant having at least one stalk having a plurality of knuckles thereon, the method comprising the steps of:
removing a tip from the stalk;
waiting for a first period of time during which time buds develop on the stalk;
cutting at least one section containing a bud from the stalk, each section having at least one knuckle;
potting sections having a bud thereon in soil such that a first end of the stalk and the bud are above the soil and a second end of the stalk is below the soil;
waiting for a second period of time to permit leaf shoot development on the seedling.

28. The method of claim 27, wherein the tip is removed at a point at least two knuckles from a top portion of the stalk.

29. The method of claim 27, wherein the first period of time is in the range of about 10 to about 18 days.

30. The method of claim 29, wherein the first period of time is about 14 days.

31. The method of claim 27, wherein the sections are cut diagonally relative to the stalk.

32. The method of claim 27, further comprising the step of sealing cut ends of each section.

33. The method of claim 27, wherein the second period of time is between about 2 weeks to about 5 weeks.

34. The method of claim 33, wherein the second period of time is about 4 weeks.

35. A kava seedling produced according to the method of claim 27.

36. A method of producing kava seedlings from a parent kava plant having at least one stalk having a plurality of knuckles thereon and a root mass, the method comprising the steps of:
removing a tip from the stalk;
waiting for a first period of time during which time buds develop on the stalk;
cutting the stalk from the plant at substantially ground level;
preparing seedlings from the cut stalk;
waiting a second period of time; and
harvesting the root mass of the parent kava plant.

37. The method of claim 36, wherein the first period of time is in the range of about 10 to about 18 days.

38. The method of claim 37, wherein the first period of time is about 14 days.

39. The method of claim 36, wherein the second period of time is between about 7 and 14 days.

40. A kava seedling produced according to the method of claim 36.

41. A method of cultivating kava comprising the steps of:
providing a parent kava plant having at least one stalk having a plurality of knuckles thereon and a root mass;
removing a tip from the stalk;
waiting for a first period of time during which time buds develop on the stalk;
cutting at least one section of the stalk containing a bud;
using the section to prepare a kava seedling;
providing a generally leveled bed of porous material substantially free from organic matter;
forming a mound over the bed of a combination of filler material and organic matter, the organic matter comprising in the range of approximately 5% to 80% by mass of the combination; and
planting the kava seedling in the mound.

42. The method of claim 41, wherein the first period of time is between about 10 and 18 days.

43. The method of claim 41, wherein the step of cutting at least one section of the stalk containing a bud comprises cutting each stalk of the parent kava plant at substantially ground level;
the method further comprising the step of harvesting the root mass of the parent plant a second period of time after the cutting step.

44. The method of claim 43, wherein the second period of time is between about 7 and 14 days.

45. A method of cultivating kava comprising the steps of:
providing a parent kava plant having at least one stalk having a plurality of knuckles thereon and a root mass;
removing a tip from the stalk;
waiting for a first period of time during which time a plurality of buds develop on the stalk;
cutting a plurality of sections from the stalk, each containing a bud;
using the sections to prepare a plurality of kava seedlings;
providing a mounded row having a height between about 12 and 40 inches and comprising predominantly (a) clay soil which is low in organic content and (b) cinder, the mounded row having a ratio of cinder material to clay with respect to volume of about 80% to 100% cinder at a base portion of the mounded row and a ratio of between about 5% to 15% at a top portion of the mounded row; and
planting the plurality of kava seedling in the mounded row between about 12 to 18 inches apart.

46. The method of claim 45, wherein the step of cutting comprises cutting each stalk of the parent kava plant at substantially ground level;
the method further comprising the step of harvesting the root mass of the parent plant a second period of time after the cutting step.

47. The method of claim 46, wherein the second period of time is between about 7 and 14 days.

48. A method of cultivating kava plants comprising the steps of:
providing a parent kava plant having at least one stalk having a plurality of knuckles thereon and a root mass;
removing a tip from the stalk;

waiting for a first period of time during which time a plurality of buds develop on the stalk;

cutting a plurality of sections from the stalk, each containing a bud;

using the sections to prepare a plurality of kava seedlings;

providing a mounded row having a height between about 12 and 24 inches and comprising predominantly soft powdery clay;

planting the plurality of kava seedling in the mounded row about 15 to 30 inches apart.

49. The method of claim 48, wherein the step of cutting comprises cutting each stalk of the parent kava plant at substantially ground level;

the method further comprising the step of harvesting the root mass of the parent plant a second period of time after the cutting step.

50. The method of claim 49, wherein the second period of time is between about 7 and 14 days.

* * * * *